United States Patent [19]

Ohno et al.

[11] Patent Number: 5,306,690
[45] Date of Patent: Apr. 26, 1994

[54] THERMAL TRANSFER RECORDING SHEET

[75] Inventors: Akihiko Ohno; Takatoshi Nishizawa; Akira Iwai, all of Ibaraki, Japan

[73] Assignee: Oji Yuka Goseishi Co. Ltd., Tokyo, Japan

[21] Appl. No.: 45,794

[22] Filed: Apr. 15, 1993

[30] Foreign Application Priority Data

Apr. 30, 1992 [JP] Japan .................................. 4-111053

[51] Int. Cl.⁵ ........................ B41M 5/035; B41M 5/38
[52] U.S. Cl. .................................... 503/227; 428/195; 428/216; 428/319.9; 428/910; 428/913; 428/914
[58] Field of Search ...................... 8/471; 428/195, 216, 428/319.9, 910, 913, 914; 503/227

[56] References Cited

FOREIGN PATENT DOCUMENTS 0234563  9/1987  European Pat. Off. ............ 503/227
0455192  6/1991  Japan ................................. 503/227
459291   2/1992  Japan ................................. 503/227

*Primary Examiner*—B. Hamilton Hess
*Attorney, Agent, or Firm*—Sughrue, Mion, Zinn, Macpeak & Seas

[57] ABSTRACT

A thermal transfer recording sheet comprising a support having thereon a thermal transfer image-receiving layer, said support comprising a thermoplastic resin film containing from 3 to 60% by weight of a petroleum resin, where the thermoplastic resin film is preferably a microvoid-containing film, and the thermal transfer recording sheet exhibits excellent surface smoothness and, in case of a microvoid-containing support, also exhibits excellent cushioning properties so that the recording sheet has improved contact with a thermal head to provide a transferred image rich in gradation and which does not curl even after thermal recording.

21 Claims, 1 Drawing Sheet

THERMAL TRANSFER RECORDING SHEET

FIELD OF THE INVENTION

The present invention relates to a thermal transfer recording sheet (thermal transfer image-receiving sheet) and more particularly to a thermal transfer recording sheet which does not curl due to heat applied on transfer recording.

BACKGROUND OF THE INVENTION

Thermal transfer recording is generally carried out by heating a transfer recording material comprising a support having thereon a color forming layer containing a sublimable or vaporizable dye to sublime or vaporize the dye and transferring the dye to an image-receiving sheet to form a dye image.

More specifically, as shown in the FIGURE of the accompanying drawing, transfer recording material 1 and image-receiving sheet 2 composed of image-receiving layer 6 and support 7 are interposed between drum 8 and heating source 3, and color forming layer 5 of transfer recording material 1 is heated from a side of support 4 opposite to the side on which the color former layer 5 is present using an electrically-controlled heat source, such as a thermal head to sublime or vaporize the dye present in color forming layer 5. The sublimed or vaporized dye is thus transferred to image-receiving layer 6 to achieve thermal transfer recording.

The material forming image-receiving layer 6 is selected depending on the kind of the color former to be transferred thereto. For example, in using a heat-fusible color former, support 7 by itself can serve as an image-receiving layer. In using a sublimable disperse dye as a color former, a coated layer comprising a high molecular weight polymer, such as polyesters, may be used as an image-receiving layer.

However, conventional image-receiving recording sheet 2 has a surface roughness of from 5 to 15 μm or a thickness variation of from 10 to 20 μm per mm due to the thickness unevenness or surface roughness of support 7. This roughness or unevenness may be reduced by super-calendering to some extent but the extent is limited, and a roughness of from 3 to 5 μm or unevenness of 10 μm or more per mm still remains on the supercalendered surface. As a result, accurate dye transfer corresponding to image signals cannot be achieved even with sublimable color formers, and even less so with heat-fusible color formers. As a result, the resulting image suffers from defects, such as dot disappearance or deficiency, and roughness in intermediate tone.

Currently employed supports for the image-receiving layer include paper, opaque synthetic paper comprising a stretched film of a propylene resin containing an inorganic fine powder (see U.S. Pat. No. 4,318,950, JP-B-46-40794, the term "JP-B" as used herein means an "examined published Japanese patent application"), and coated synthetic paper comprising a transparent polyethylene terephthalate film or a transparent polyolefin film having coated thereon an inorganic compound, e.g., silica or calcium carbonate, dispersed in a binder to increase the whiteness and dyeability.

Considering after-use characteristics of an image-receiving recording sheet with a transferred dye image as to, for example, copying suitability, pencil writability, and record preservability, it is accepted that a synthetic paper comprising a void-containing stretched film of a polyolefin resin containing an inorganic fine powder is preferred as a support from the standpoint of strength, dimensional stability, and contact with a printing head, as disclosed in JP-A-60-245593, JP-A-61-112693 and JP-A-63-193836 (the term "JP-A" as used herein means an "unexamined published Japanese patent application").

In this type of synthetic paper obtained by stretching a polyolefin resin film, microvoids are formed in the film by stretching the film at a temperature lower than the melting point of the polyolefin resin so as to achieve opacity, softness to the feel, intimate contact with a printing head, and smoothness in paper feeding or discharge.

The surface temperature of an image-receiving sheet on transfer recording reaches, momentarily, 190° to 200° C. However, the melting point of the polyolefin resin film is 167° C. or less, which is considerably lower than that of polyethylene terephthalate or a polyamide (240° to 255° C.). As a result, the image-receiving recording sheet with a transferred dye image thereon tends to curl inward due to the heat involved in transfer recording as disclosed in JP-A-60-245593 and JP-A-61-283593.

In order to prevent curling, a polyolefin resin film may be laminated with other base resin film and the stretching temperature can be set in the vicinity of the melting point of the base resin. In this case, however, the base resin has reduced opacity and reduced softness to the feel.

SUMMARY OF THE INVENTION

An object of the present invention is to provide a thermal transfer recording sheet which curls little even when heat is applied on transfer recording, resulting in no problem for practical use.

As a result of extensive investigations, it has now been found that curling of a thermal transfer recording sheet can be reduced by using as a support for an image-receiving layer a thermoplastic resin film containing from 3 to 60% by weight of a petroleum resin capable of improving heat-sealability, transparency, and printability of wrapping films or printing films comprising polypropylene. The present invention has been completed based on this finding.

The present invention thus provides a thermal transfer recording sheet comprising a support having thereon a thermal transfer image-receiving layer, wherein the support comprises a thermoplastic resin film containing from 3 to 60% by weight of a petroleum resin.

BRIEF DESCRIPTION OF THE DRAWING

The FIGURE is a schematic cross section illustrating a thermal transfer recording system in which a support 7 of a thermal transfer recording sheet 2 is interposed between a printing head 3 and a drum 8.

DETAILED DESCRIPTION OF THE INVENTION

Figure 1:
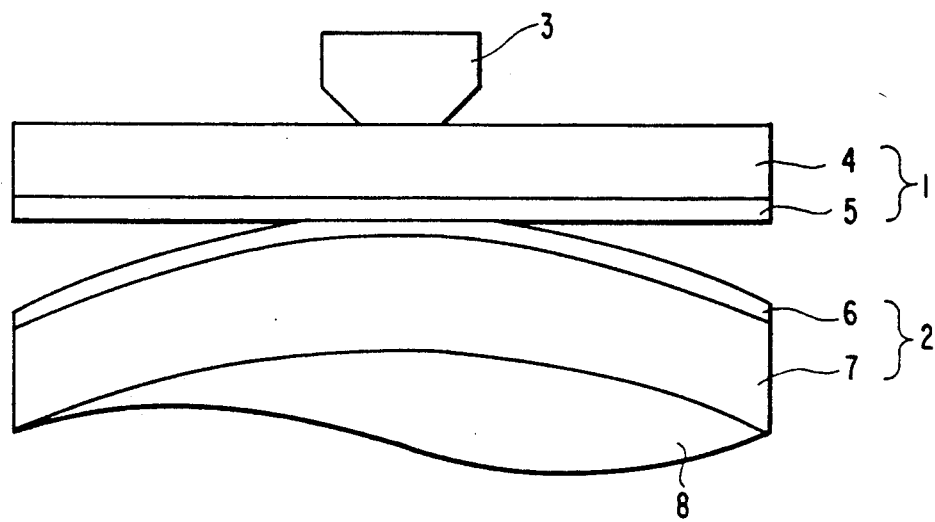

The thermal transfer recording sheet according to the present invention comprises a support comprising a thermoplastic resin film containing a petroleum resin having thereon a thermal transfer image-receiving layer.

The support comprises a thermoplastic synthetic resin and a petroleum resin, and preferably an inorganic fine powder-containing thermoplastic resin and a petroleum resin.

Polyolefin resins are suitable as the thermoplastic resin. Examples of suitable polyolefin resins which can be used include polyethylene, polypropylene, an ethylene-propylene copolymer, an ethylene-vinyl acetate copolymer, a propylene-butene-1 copolymer, poly(4-methylpentene-1), and polystyrene.

In addition to polyolefin resins, other thermoplastic resins, such as high melting polyamides such as nylon 6, nylon 66, and so on, polyphenylenesulfide, polycarbonate, polyethylene terephthalate, and polybutylene terephthalate, may also be employed, but polyolefin resins having 1 to 10 g/10 minutes of melt flow rate and more than 160° C. of melting points, and particularly polypropylene resins are preferred from a solvent resistance.

The inorganic fine powder which may be incorporated into the thermoplastic resin in order to form many microvoids inside the thermoplastic resin film includes powders of calcium carbonate, calcined clay, diatomaceous earth, talc, titanium oxide, barium sulfate, aluminum sulfate or silica, each usually having an average particle size of 10 μm or less, and preferably 4 μm or less.

The petroleum resins which can be incorporated into the thermoplastic resin film are hydrocarbon resins having a softening point of 70° to 150° C., molecular weight of 450° to 1,500° and specific gravity of 0.96 to 1.10, inclusive of their hydrogenation products, prepared by polymerization of petroleum materials obtained by thermal cracking of petroleum in the presence of a polymerization catalyst. Petroleum materials which are polymerized are generally mixtures of monomers capable of forming resins, such as terpenes, dicyclopentadiene, styrene, methylstyrene, vinyltoluene, indene, methylindene, butadiene, isoprene, piperylene, pentylene, etc. The petroleum resins may be a homopolymer of any of these monomers, a copolymer of more than one of these monomers, or a mixture thereof.

According to *JET1*, Vol. 37, No. 2, pp. 75-79 (1989), petroleum resins are classified as materials into (1) aliphatic petroleum resins ($C_5$ petroleum resins), (2) aromatic petroleum resins ($C_9$ petroleum resins), (3) aliphatic/aromatic or aliphatic/alicyclic copolymer-based petroleum resins ($C_5/C_9$ petroleum resins), (4) dicyclopentadiene-based petroleum resins (DCPD petroleum resins), and (5) hydrogenated petroleum resins derived from (1) to (4) above.

As described above, petroleum resins which can be used in the present invention are the above-described hydrocarbon resins, including hydrocarbon polymers derived from coke oven gas, coal tar fraction cracked products, thermally cracked petroleum materials, essentially pure hydrocarbons, turpentine oil or hydrocarbon materials derived from turpentine oil. Typical hydrocarbon resins include coumarone-indene resins, a $C_5$ petroleum fraction, styrene copolymers, dicyclopentadiene resins, and terpene resins. These petroleum resins are described in Kirk Osmar, *Encyclopedia of Chemical Technology*, 3rd Ed., Vol. 11, pp. 242-255 (1966).

Examples of coumarone-indene resins are hydrocarbon resins obtained by polymerization of resin-forming substances present in coal tar distillate recovered from a coke oven, phenol-modified coumarone-indene resins, and derivatives thereof.

Suitable dicyclopentadiene resins include homo- or copolymer resins of dicyclopentadiene obtained from coal tar fractions or cracked petroleum gas. The dicyclopentadiene resins are prepared by maintaining cyclopentadiene-containing materials at a high temperature for quite a long time and include dimers, trimers and high polymers depending on the temperature at which the materials are maintained.

Appropriate terpene resins include polymers of monoterpene hydrocarbons represented by the molecular formula $C_{10}H_{16}$ which are present in most essential oils and oleo-resins (e.g., α-pinene, β-pinene, dipentene, limonene, myrcene, bornylene, camphene, and analogous terpenes) and phenol-modified terpene resins.

Preferred petroleum resins are hydrogenated dicyclopentadiene petroleum resins having a softening point (ring and ball method) of from 70° to 150° C. and hydrogenated terpene resins.

Commercially available hydrogenated petroleum resins which can be used in the present invention include "Arkon" (hydrogenated aromatic petroleum resin ($C_9$), produced by Arakawa Chemical Kogyo K.K.), "Clearon" (hydrogenated terpene petroleum resin, produced by Yasuhara Chemical K.K.), "Escorez" (hydrogenated dicyclopentadiene petroleum resin, produced by Tonex Co., Ltd.), and "Marukarez" (hydrogenated dicyclopentadiene petroleum resin, produced by Maruzen Petro-Chemical Co., Ltd.).

These petroleum resins are generally compounded into the thermoplastic resin by melt-kneading. The petroleum resin is used in an amount of from 3 to 60% by weight, and preferably from 5 to 50% by weight, based on the weight of the thermoplastic resin film.

The support to be used in the thermal transfer recording sheet according to the present invention is prepared by melt-kneading a mixture comprising from 3 to 60% by weight of a petroleum resin and from 60 to 97% by weight of a thermoplastic resin in an extruder and molding the molten mixture into a film. Supports of thermosensitive recording sheets disclosed in U.S. Pat. Nos. 4,778,782, 4,833,116, and 4,975,408 may be used as the support in the present invention.

The thermoplastic resin film as a support can be prepared basically in the same manner as for general thermoplastic resin films with the exception that the film contains from 3 to 60% by weight of a petroleum resin.

That is, the thermoplastic resin film can be prepared by, for example, blown-film extrusion, T-die extrusion, uniaxial stretching of a blown film or a T-die extruded film at a stretch ratio of 1.3 to 8, biaxial stretching of such a film at a stretch ratio of 1.3 to 12 in each direction, or laminating a combination of these films.

Considering after-use characteristics of the image-receiving sheet with a transferred dye image thereon (i.e., copying suitability, pencil writability, preservability), preferred thermoplastic resin films are those having many microvoids (synthetic paper) which are obtained by stretching a thermoplastic resin film containing an inorganic fine powder from the standpoint of strength, dimensional stability, and contact with a printing head.

Suitable synthetic papers include the following three embodiments.

1) A microvoid-containing film obtained by bi-axially stretching a thermoplastic resin film containing from 3 to 60% by weight, preferably from 5 to 50% by weight, of a petroleum resin, from 5 to 60% by weight, preferably from 10 to 45% by weight, of an inorganic fine powder, and from 20 to 92% by weight, and preferably from 25 to 85% by weight, of a thermoplastic resin in the machine direction at a stretch ratio of from 3 to 10, and preferably from 4 to 7, and in the transverse direction at a stretch ratio of from 3 to 15, and preferably from 4 to 12.

2) A microvoid-containing laminate film prepared by laminating (A) a thermoplastic resin film containing from 3 to 60% by weight, preferably from 5 to 50% by weight, of a petroleum resin, from 5 to 60% by weight, preferably from 10 to 45% by weight, of an inorganic fine powder, and from 20 to 92% by weight, and preferably from 25 to 85% by weight, of a thermoplastic resin as a surface layer and (B) a thermoplastic resin film containing from 5 to 60% by weight, and preferably from 10 to 45% by weight, of an inorganic fine powder as a base layer and biaxially stretching the laminate at a stretch ratio of from 3 to 10, and preferably from 4 to 7, in the machine direction and at a stretch ratio of from 3 to 15, and preferably of from 4 to 12, in the transverse direction, either simultaneously or successively.

In this embodiment, it is essential that layer (A) containing the petroleum resin be on the side on which a thermal transfer-receiving layer is to be coated and has a thickness of at least 1 μm, and preferably from 2 to 40 μm. Biaxially stretched base layer (B) may have either a single layer structure or a multi-layered structure and may contain 60% by weight or less, and preferably from 5 to 30% by weight, of a petroleum resin.

3) A microvoid-containing laminate film obtained by laminating (A) an unstretched thermoplastic resin film containing from 3 to 60% by weight, preferably from 5 to 50% by weight, of a petroleum resin, from 10 to 80% by weight, preferably from 15 to 65% by weight, of an inorganic fine powder, and from 20 to 87% by weight, and preferably from 25 to 80% by weight, of a thermoplastic resin as a surface layer on one side of (B) a uniaxially stretched film obtained by stretching a thermoplastic resin film containing from 5 to 45% by weight, and preferably from 8 to 30% by weight, of an inorganic fine powder at a stretch ratio of from 3 to 10, and preferably from 4 to 7, as a base layer, laminating (C) a thermoplastic resin film containing from 10 to 80% by weight, and preferably from 15 to 65% by weight, of an inorganic fine powder on the other side of the base layer, and stretching the resulting laminate in the direction perpendicular to the stretching direction of the uniaxially stretched thermoplastic resin film (B) at a stretch ratio of from 3 to 15, and preferably from 4 to 12, using a tenter.

In this embodiment, too, it is essential that layer (A) containing the petroleum resin be on the side on which a thermal transfer image-receiving layer is to be coated and has a thickness of at least 1 μm, and preferably from 2 to 40 μm. The stretched base layer (B) may have either a single layer structure or a multi-layered structure and may contain 60% by weight or less, and preferably from 5 to 30% by weight, of a petroleum resin.

The thermoplastic resin film (support) is preferably a microvoid-containing resin film. The term "microvoid-containing" means that the film has a void (%) of from 10 to 60%, and preferably from 15 to 50%, calculated according to the following equation:

$$v = \frac{\rho_0 - \rho}{\rho_0} \times 100 \, (\%)$$

wherein $\rho_0$ is the density of the unstretched film; and $\rho$ is a density of the stretched void-containing film.

The microvoid-containing thermoplastic resin film has excellent cushioning properties due to the microvoids so that the resulting thermal transfer recording sheet has excellent contact with a thermal head to form a clear image. The microvoids also contribute to heat-insulating properties so that the film, although it has been stretched, is prevented from shrinking on heating.

The support (thermoplastic resin film) usually has a thickness of from 50 to 500 μm, and preferably from 55 to 250 μm.

A thermal transfer image-receiving layer is provided on the support to provide a thermal transfer recording sheet (thermal transfer image-receiving paper) according to the present invention.

Materials for forming a thermal transfer image-receiving layer preferably include high molecular weight polymers, such as acrylic resins and polyolefin resins, which are particularly suited for receiving heat-fusible color formers containing a pigment; and high molecular weight polymers, such as polyesters, and active clay are dyeable with sublimable or vaporizable dyes.

Preferred of these materials are acrylic resins, including (A) an acrylic copolymer resin, (B) a mixture of (1) an acrylic copolymer resin (2) an amino compound having an amino group, and (3) an epoxy compound, and (C) a mixture of (A) or (B) and an inorganic or organic filler.

Suitable monomer components in acrylic copolymer resins include dimethylaminoethyl methacrylate, diethylaminoethyl methacrylate, dibutylaminoethyl methacrylate, dimethylaminoethyl acrylamide, diethylaminoethyl methacrylamide, and dimethylaminoethyl methacrylamide.

Other vinyl monomers as a component in acrylic copolymer resins include styrene, methyl methacrylate, ethyl acrylate, n-butyl acrylate, t-butyl acrylate, ethyl methacrylate, vinyl chloride, ethylene, acrylic acid, methacrylic acid, itaconic acid, acrylonitrile, and methacrylamide.

Amino compounds as a component in (B) include polyethylenepolyamines, e.g., diethylenetriamine and triethylenetetramine, polyethyleneimine, ethyleneurea, an epichlorohydrin adduct of polyaminepolyamide (e.g., "Kymene-557H" produced by Dick-Hercules, "AF-100" produced by Arakawa Rinsan Kagaku Kogyo K.K.), and an aromatic glycidyl ether or ester adduct of a polyamine-polyamide (e.g., "Sanmide 352", "Sanmide 351" and "X-2300-75" produced by Sanwa Kagaku K.K. and "Epicure-3255" produced by Shell Kagaku K.K.).

Epoxy compounds as a component in (B) include bisphenol A diglycidyl ether, bisphenol F diglycidyl ether, phthalic acid diglycidyl ester, polypropylene glycol diglycidyl ether, and trimethylolpropane triglycidyl ether.

Inorganic fillers as a component in (C) include synthetic silica (e.g., white carbon) and inorganic pigments, e.g., calcium carbonate, clay, talc, aluminum sulfate, titanium dioxide, and zinc oxide, each having an average particle size of 0.5 μm or less. Preferred fillers are synthetic silica (e.g., white carbon) and precipitated calcium carbonate having an average particle size of 0.2 μm or less.

Organic fillers as a component in (C) include fine particles of various high molecular weight polymers preferably having a particle diameter of 10 μm or less. Suitable high molecular weight polymers include methyl cellulose, ethyl cellulose, polystyrene, polyurethane, urea-formaldehyde resins, melamine resins, phenol resins, iso-(or diiso-)butylene/maleic anhydride copolymers, styrene/maleic anhydride copolymers, polyvinyl acetate, polyvinyl chloride, vinyl chloride/vinyl acetate copolymers, polyesters, polyacrylic esters, polymethacrylic esters, and styrene/butadiene/acrylate copolymers.

In particular, the inorganic filler may be surface treated with a nonionic, cationic or amphoteric surface active agent, e.g., sulfonated oils, sodium dodecylsulfate, organic amines, metallic soaps, and sodium lignin sulfonate, to improve wettability with inks of the thermal transfer recording material.

These fillers are usually used in an amount of 30% by weight or less.

The material forming a thermal transfer image-receiving layer is coated on the outermost surface layer of the support using a coating machine, e.g., a blade coater, an air knife coater, a roll coater, and a bar coater, a size press, a gate roll machine, etc. and dried to form a thermal transfer image-receiving layer having a thickness of from 0.2 to 20 μm, and preferably from 0.5 to 10 μm.

If desired, the resulting thermal transfer image-receiving sheet may be subjected to calendering to further improve the surface smoothness.

In addition, an overcoat layer may be coated thereon for the purpose of protection, etc. of the recording layer. Further, other various known techniques currently employed in the field of thermal transfer recording sheets may be utilized in the present invention. For example, a pressure-sensitive adhesive layer may be provided on the reverse side of the thermal transfer recording sheet to obtain adhesive labels.

Moreover, the support of thermal transfer recording sheet of this invention can be applied to that of a thermal sensitive recording systems, in which a monochromatic or full color image of continuous gradation is recorded using a thermal recording head, and the recording media therefor, such as thermal video printers and thermal facsimile machines.

Thermal sensitive recording layer material is known as described in U.S. Pat. No. 5,122,413, U.S. Pat. No. 4,996,182 and so on.

The present invention is now illustrated in greater detail by reference to the following examples, but it should be understood that the present invention is not limited thereto. All percents, parts, and ratios are given by weight unless otherwise indicated.

The thermal transfer recording sheets produced were evaluated as follows.

1) Curling:

The thermal transfer recording sheet on which an image had been transferred using a color video printer "VD-50" manufactured by Hitachi., Ltd. was cut to a width of 200 mm in the machine direction and to a width of 120 mm in the. transverse direction to prepare a rectangular sample. The sample was placed on a flat surface at 23° C. and 50% RH for 24 hours, and the height of the curling (mm) was measured.

2) Thermal Deformation of Surface:

The degree of deformation on the surface of the sample which had been subjected to curling height measurement was evaluated visually according to the following rating system.

5 ... No deformation at all.
4 ... Substantially no deformation.
3 ... No problem for practical use.
2 ... Interferes with practical use.
1 ... No good due to great deformation.

3) Gradation:

Printing on thermal transfer recording sheet was conducted using a printer produced by Ohkura Denki K. K. (dot density: 6 dot/mm; applied electric power: 0.23 W/dot) while varying the printing pulse width, and the Macbeth density of the resulting image was measured.

Further, the gradation of the image obtained at a pulse width of 1.3 milliseconds was evaluated visually according to the following rating system.
5 ... Very good
4 ... Good
3 ... No problem for practical use
2 ... Interferes with practical use
1 ... Poor

EXAMPLE 1

Preparation of Support

A composition comprising 85% of polypropylene having a melt flow rate (MFR) of 0.8 g/10 min and 15% of ground calcium carbonate having an average particle size of 1.5 μm was melt-kneaded in an extruder set at 270° C., extruded from a die into a sheet, and cooled in a cooling apparatus to obtain an unstretched sheet.

The sheet was heated to 150° C. and stretched in the machine direction at a stretch ratio of 5 to obtain a 5-fold stretched sheet as a base layer (B).

A composition comprising 40% of polypropylene having an MFR of 4.0 g/10 min, 45% of ground calcium carbonate having an average particle size of 1.5 μm, and 15% of a petroleum resin "Clearon P-125" (produced by Yasuhara Chemical K.K.; softening point: 125° C.) was melt-kneaded in an extruder set at 220° C. and extruded from a die into a sheet to obtain an unstretched surface layer (A). Surface layer (A) was then laminated on one side of uniaxially stretched base layer (B).

A composition comprising 55% of polypropylene having an MFR of 4.0 g/10 min and 45% of ground calcium carbonate having an average particle size of 1.5 μm was melt-kneaded in an extruder set at 220° C. and extruded from a die into a sheet to obtain unstretched back layer (C). Back layer (C) was laminated on the other side of base layer (B).

The resulting laminate was cooled one time to 60° C., heated to 162° C., stretched in the transverse direction at a stretch ratio of 7.5 using a tenter, subjected to annealing at 167° C., cooled to 60° C., and trimmed to obtain a support having a three-layer structure (A/B/C=15 μm/120 μm/15 μm).

Formation of Image-Receiving Layer

A coating composition having the following formulation was coated on surface layer (A) of the above-prepared support using a wire bar coater to a dry thickness of 4 μm and dried to form an image-receiving layer.

| Coating Composition Formulation: | |
|---|---|
| Saturated Polyester: | |
| "Vylon 200" produced by Toyo Spinning Co., Ltd.; Tg: 67° C. | 5.3 parts |
| "Vylon 290" produced by Toyo Spinning Co., Ltd.; Tg: 77° C. | 5.3 parts |
| Vinyl Chloride-Vinyl Acetate Copolymer | 4.5 parts |

-continued

| Coating Composition Formulation: | |
|---|---|
| ("Vinylite VYHH" produced by Union Carbide Co.) | |
| Titanium Oxide ("KA-10" produced by Titan Kogyo K.K.) | 1.5 parts |
| Amino-Modified Silicone Oil ("KF-393" produced by Shin-etsu Silicone K.K.) | 1.1 parts |
| Epoxy-Modified Silicone Oil ("X-22-343" produced by Shin-etsu Silicone K.K.) | 1.1 parts |

Evaluation

The curling height, thermal surface deformation, and gradation of the resulting thermal transfer recording sheet were evaluated using the methods described above. The results obtained are shown in Table 2 below.

EXAMPLES 2, 3 AND 7

A thermal transfer recording sheet was prepared in the same manner as in Example 1, except for using, as a petroleum resin, "Arkon P-125" produced by Arakawa Kagaku K.K. (softening point: 125° C.) (Example 2), "Escorez E 5320" produced by Tonex Co., Ltd. (softening point: 125° C.) (Example 3), or "Clearon P-85" produced by Yasuhara Chemical K.K. (softening point: 85° C.) (Example 7). The resulting recording sheet was evaluated in the same manner as in Example 1. The results are shown in Table 2 below.

EXAMPLES 4, 5, 6, 8 AND 9 AND COMPARATIVE EXAMPLES 1 TO 3 AND 5

A thermal transfer recording sheet was prepared in the same manner as in Example 1, except for changing the composition of each layer of the support as shown in Tables 1 to 4. The back layer (C) of the support used in Comparative Example 1 was a uniaxially stretched film.

Each of the resulting recording sheets was evaluated in the same manner as in Example 1. The results are shown in Tables 2 and 4 below.

EXAMPLE 10

A thermal transfer recording sheet was prepared in the same manner as in Example 1, except for using talc as an inorganic fine powder. The resulting recording sheet was evaluated in the same manner as in Example 1. The results are shown in Table 2.

COMPARATIVE EXAMPLE 4

A thermal transfer recording sheet was prepared in the same manner as in Example 1, except for changing the thickness of the layer (A) or (B) of the support by changing the die gap as shown in Table 3 below. The resulting recording sheets was evaluated in the same manner as in Example 1. The results are shown in Table 4 below.

EXAMPLE 11

Preparation of Support

A composition comprising 65% of polypropylene having an MFR of 0.8 g/10 min, 20% of ground calcium carbonate having an average particle size of 1.5 μm, and 15% of a petroleum resin "Clearon P-125" (softening point: 125° C.) was melt-kneaded in an extruder set at 270° C., extruded from a die into a sheet, and cooled in a cooling apparatus to obtain an unstretched sheet..

The sheet was heated to 150° C. and stretched in the machine direction at a stretch ratio of 5, again heated to 162° C., and then stretched in the transverse direction at that temperature at a stretch ratio of 7.5 using a tenter. The stretched film was annealed at 167° C., cooled to 60° C., and trimmed to obtain a support having a thickness of 150 μm.

Formation of Image-Receiving Layer

The same coating composition as described in Example 1 was coated on the above-prepared support in the same manner as in Example 1 to obtain a thermal transfer recording sheet.

Evaluation

The resulting thermal transfer recording sheet was evaluated in the same manner as in Example 1. The results obtained are shown in Table 2 below.

EXAMPLE 12

Preparation of Support

Composition (A) comprising 65% of polypropylene having an MFR of 0.8 g/10 min, 20% of ground calcium carbonate having an average particle size of 1.5 μm, and 15% of a petroleum resin "Clearon P-125" (softening point: 125° C.) and composition (B) comprising 80% of polypropylene having an MFR of 0.8 g/10 min and 20% of ground calcium carbonate having an average particle size of 1.5 μm were separately melt-kneaded in an extruder set at 270° C., fed to the same die, laminated in a molten state in the die, coextruded from the die at 250° C. into a sheet, and cooled to about 60° C. using cooling rolls.

The resulting laminate was heated to 145° C., stretched in the machine direction at a stretch ratio of 5 utilizing the difference in peripheral speed of a number of rolls, again heated to about 162° C., and then stretched in the transverse direction at that temperature at a stretch ratio of 8.5 using a tenter. The stretched film was annealed at 165° C., cooled to 60° C., and trimmed to obtain a support having a double layer structure (A/B=20 μm/130 μm).

Formation of Image-Receiving Layer

An image-receiving layer was formed on the above-prepared support in the same manner as in Example 1 to obtain a thermal transfer recording sheet.

Evaluation

The resulting thermal transfer recording sheet was evaluated in the same manner as in Example 1. The results obtained are shown in Table 2 below.

EXAMPLE 14

Preparation of Support

Composition (A) comprising 65% of polypropylene having an MFR of 0.8 g/10 min, 20% of ground calcium carbonate having an average particle size of 1.5 μm, and 15% of a petroleum resin "Clearon P-125" (softening point: 125° C.), composition (B) comprising 80% of polypropylene having an MFR of 0.8 g/10 min and 20% of ground calcium carbonate having an average particle size of 1.5 μm, and composition (C) comprising 65% of polypropylene having an MFR of 0.8 g/10 min, 20% of ground calcium carbonate having an average particle size of 1.5 μm, and 15% of a petroleum resin "Clearon P-125", (softening point: 125° C.) were separately melt-kneaded in a respective extruder set at 270° C., fed to the same die, laminated in a molten state in the die, co-extruded from the die at 250° C. into a sheet, and cooled to about 60° C. using cooling rolls.

The resulting laminate was heated to 145° C., stretched in the machine direction at a stretch ratio of 5 utilizing the difference in peripheral speed of a number of rolls, again heated to about 162° C., and then stretched in the transverse direction at that temperature at a stretch ratio of 8.5 using a tenter. The stretched film was subjected to annealing at 165° C., cooled to 60° C., and trimmed to obtain a support having a three-layer structure (A/B/C=20 μm/110 μm/20 μm).

Formation of Image-Receiving Layer

An image-receiving layer was formed on layer (A) of the above-prepared support in the same manner as in Example 1 to obtain a thermal transfer recording sheet.

Evaluation

The resulting thermal transfer recording sheet was evaluated in the same manner as in Example 1. The results obtained are shown in Table 4 below.

EXAMPLE 13 AND COMPARATIVE EXAMPLES 9 AND 10

A thermal transfer recording sheet was prepared in the same manner as in Example 12, except for changing the composition of each layer of the support as shown in Tables 3 and 4 below. Each of the resulting recording sheets was evaluated in the same manner as in Example 1. The results are shown in Table 4 below.

COMPARATIVE EXAMPLES 6 TO 8

A thermal transfer recording sheet was prepared in the same manner as in Example 11, except for changing the composition of the support as shown in Table 3 below. Each of the resulting recording sheets was evaluated in the same manner as in Example 1. The results are shown in Table 4 below.

EXAMPLE 15

The support for a thermal transfer recording sheet as prepared in Example 1 was laminated on both sides of a fine paper having a thickness of 60 μm with an adhesive in a manner such that the petroleum resin-containing layer (A) was on the side on which an image-receiving layer was to be formed to obtain a support having a 7-layered structure (A/B/C/fine paper/A/B/C).

An image-receiving layer was formed on the side of layer (A) in the same manner as in Example 1 to obtain a thermal transfer recording sheet. When evaluated, the thermal transfer recording sheet had a curling height of 2 mm, thermal surface deformation rated "5", and gradation rated "5".

TABLE 1

| | Support Structure | | | | | | | |
|---|---|---|---|---|---|---|---|---|
| | Surface Layer (A) (uniaxially stretched) | | | | Base Layer (B) (biaxially stretched) | | | |
| | Thermoplastic Resin (%) | Petroleum Resin (%) | Inorganic Fine Powder (%) | Thickness (μm) | Thermoplastic Resin (%) | Petroleum Resin (%) | Inorganic Fine Powder (%) | Thickness (μm) |
| Example 1 | PP (40) | Clearon P-125 (15) | CaCO₃ (45) | 15 | PP (85) | — | CaCO₃ (15) | 120 |
| Example 2 | PP (40) | Akron P-125 (15) | CaCO₃ (45) | 15 | PP (85) | — | CaCO₃ (15) | 120 |
| Example 3 | PP (40) | Escorez E5320 (15) | CaCO₃ (45) | 15 | PP (85) | — | CaCO₃ (15) | 120 |
| Example 4 | PP (40) | Clearon P-125 (40) | CaCO₃ (20) | 15 | PP (85) | — | CaCO₃ (15) | 120 |
| Example 5 | PP (40) | Clearon P-125 (15) | CaCO₃ (45) | 15 | PP (75) | Clearon P-125 (10) | CaCO₃ (15) | 120 |
| Example 6 | PP (40) | Clearon P-125 (15) | CaCO₃ (45) | 15 | PP (85) | — | CaCO₃ (15) | 120 |
| Example 7 | PP (40) | Clearon P-85 (15) | CaCO₃ (45) | 15 | PP (85) | — | CaCO₃ (15) | 120 |
| Example 8 | PP (85) | Clearon P-125 (15) | — | 15 | PP (85) | — | CaCO₃ (15) | 120 |
| Example 9 | PP (85) | Clearon P-125 (15) | — | 15 | PP (100) | — | — | 120 |
| Example 10 | PP (40) | Clearon P-125 (15) | talc (45) | 15 | PP (85) | — | talc (15) | 120 |
| Example 11* | — | — | — | — | PP (65) | Clearon P-125 (15) | CaCO₃ (20) | 150 |
| Example 12** | PP (65) | Clearon P-125 (15) | CaCO₃ (20) | 20 | PP (80) | — | CaCO₃ (20) | 130 |

TABLE 2

| | Support Structure Back Layer (C) (uniaxially stretched) | | | | Results of Evaluation | | | |
|---|---|---|---|---|---|---|---|---|
| | Thermoplastic Resin (%) | Petroleum Resin (%) | Inorganic Fine Powder (%) | Thickness (μm) | Voids in Support (%) | Curling Height (mm) | Thermal Surface Deformation | Gradation |
| Example 1 | PP (55) | — | CaCO₃ (45) | 15 | 31 | 3 | 5 | 5 |
| Example 2 | PP (55) | — | CaCO₃ (45) | 15 | 31 | 4 | 5 | 5 |
| Example 3 | PP (55) | — | CaCO₃ (45) | 15 | 32 | 4 | 5 | 5 |
| Example 4 | PP (55) | — | CaCO₃ (20) | 15 | 30 | 2 | 4 | 4 |
| Example 5 | PP (55) | — | CaCO₃ (45) | 15 | 31 | 2 | 4 | 5 |
| Example 6 | PP (40) | Clearon P-125 (15) | CaCO₃ (45) | 15 | 31 | 3 | 5 | 5 |
| Example 7 | PP (55) | — | CaCO₃ (45) | 15 | 30 | 2 | 4 | 4 |
| Example 8 | PP (55) | — | CaCO₃ (45) | 15 | 25 | 4 | 5 | 4 |
| Example 9 | PP (100) | — | — | 15 | 10 | 5 | 5 | 3 |
| Example 10 | PP (55) | — | talc (45) | 15 | 22 | 4 | 5 | 4 |
| Example 11 | — | — | — | — | 38 | 5 | 4 | 5 |
| Example 12 | — | — | — | — | 39 | 6 | 5 | 5 |

TABLE 3

| | Support Structure | | | | | | | |
|---|---|---|---|---|---|---|---|---|
| | Surface Layer (A) (uniaxially stretched) | | | | Base Layer (B) (biaxially stretched) | | | |
| | Thermoplastic Resin (%) | Petroleum Resin (%) | Inorganic Fine Powder (%) | Thickness (μm) | Thermoplastic Resin (%) | Petroleum Resin (%) | Inorganic Fine Powder (%) | Thickness (μm) |
| Example 13** | PP (85) | Clearon P-125 (15) | — | 20 | PP (100) | — | — | 130 |
| Example 14** | PP (65) | Clearon P-125 (15) | CaCO$_3$ (20) | 20 | PP (80) | — | CaCO$_3$ (20) | 110 |
| Comparative Example 1 | PP (55) | — | CaCO$_3$ (45) | 15 | PP (85) | — | CaCO$_3$ (15) | 120 |
| Comparative Example 2 | PP (54) | Clearon P-125 (1) | CaCO$_3$ (45) | 15 | PP (85) | — | CaCO$_3$ (15) | 120 |
| Comparative Example 3 | PP (25) | Clearon P-125 (65) | CaCO$_3$ (10) | 15 | PP (85) | — | CaCO$_3$ (15) | 120 |
| Comparative Example 4 | PP (40) | Clearon P-125 (15) | CaCO$_3$ (45) | 0.5 | PP (85) | — | CaCO$_3$ (15) | 134.5 |
| Comparative Example 5 | PP (55) | — | CaCO$_3$ (45) | 15 | PP (70) | Clearon P-125 (15) | CaCO$_3$ (15) | 120 |
| Comparative Example 6 | — | — | — | — | PP (80) | — | CaCO$_3$ (20) | 150 |
| Comparative Example 7 | — | — | — | — | PP (79) | Clearon P-125 (1) | CaCO$_3$ (20) | 150 |
| Comparative Example 8 | — | — | — | — | PP (25) | Clearon P-125 (65) | CaCO$_3$ (10) | 150 |
| Comparative Example 9** | PP (80) | — | CaCO$_3$ (20) | 20 | PP (65) | Clearon P-125 (15) | CaCO$_3$ (20) | 130 |
| Comparative Example 10** | PP (65) | Clearon P-125 (15) | CaCO$_3$ (20) | 0.5 | PP (65) | Clearon P-125 (15) | CaCO$_3$ (20) | 149.5 |

TABLE 4

| | Support Structure Back Layer (C) (biaxially stretched) | | | | Results of Evaluation | | | |
|---|---|---|---|---|---|---|---|---|
| | Thermoplastic Resin (%) | Petroleum Resin (%) | Inorganic Fine Powder (%) | Thickness (μm) | Voids in Support (%) | Curling Height (mm) | Thermal Surface Deformation | Gradation |
| Example 13 | — | — | — | — | 12 | 6 | 5 | 3 |
| Example 14 | PP (65) | Clearon P-125 (15) | CaCO$_3$ (20) | 20 | 38 | 5 | 5 | 5 |
| Comparative Example 1*** | PP (55) | — | CaCO$_3$ (45) | 15 | 33 | 30 | 5 | 5 |
| Comparative Example 2*** | PP (55) | — | CaCO$_3$ (45) | 15 | 32 | 27 | 5 | 5 |
| Comparative Example 3*** | PP (55) | — | CaCO$_3$ (45) | 15 | 33 | 2 | 1 | 3 |
| Comparative Example 4*** | PP (55) | — | CaCO$_3$ (45) | 15 | 31 | 23 | 5 | 5 |
| Comparative Example 5*** | PP (55) | — | CaCO$_3$ (45) | 15 | 30 | 20 | 5 | 5 |
| Comparative Example 6 | — | — | — | — | 39 | 34 | 5 | 5 |
| Comparative Example 7 | — | — | — | — | 38 | 33 | 5 | 5 |
| Comparative Example 8 | — | — | — | — | 45 | 5 | 1 | 4 |
| Comparative Example 9 | — | — | — | — | 36 | 30 | 5 | 5 |
| Comparative Example 10 | — | — | — | — | 38 | 33 | 5 | 5 |

Note:
*: A single layer structure so that the base layer serves also as a surface layer and a back layer.
**: Surface layer (A) is a biaxially stretched film.
***: Back layer (C) is a uniaxially stretched film.

As described and demonstrated above, the thermal transfer recording sheets (thermal transfer image-receiving paper) according to the present invention produced using a thermoplastic resin film containing a petroleum resin as a support have excellent surface smoothness. In particular, those using a microvoid-containing support also have excellent cushioning properties due to the many microvoids present. Thus, the thermal transfer recording sheets of the present invention achieve improved contact with a thermal head to provide a transferred image rich in gradation and curling does not occur even after thermal recording.

While the invention has been described in detail and with reference to specific examples thereof, it will be apparent to one skilled in the art that various changes and modifications can be made therein without departing from the spirit and scope thereof.

What is claimed is:

1. A thermal transfer recording sheet comprising a support having thereon a thermal transfer image-receiving layer, in which said support comprises a thermoplastic resin film containing from 3 to 60% by weight of a petroleum resin.

2. The thermal transfer recording sheet as claimed in claim 1, wherein said support is a microvoid-containing polyolefin resin film produced by stretching the film and having a void percentage of from 10 to 60% calculated according to the following equation:

$$v = \frac{\rho_0 - \rho}{\rho_0} \times 100 \, (\%)$$

wherein $\rho_0$ is the density of the unstretched film; and $\rho$ is the density of the stretched void-containing film.

3. The thermal transfer recording sheet as claimed in claim 2, wherein said support has a void percentage of from 15 to 50%.

4. The thermal transfer recording sheet as claimed in claim 1, wherein said petroleum resin has a softening point of from 70° to 150° C., molecular weight of from 450 to 1,500 and specific gravity of from 0.96 to 1.10.

5. The thermal transfer recording sheet as claimed in claim 4, wherein said petroleum resin is a hydrogenated dicyclopentadiene petroleum resin or a hydrogenated terpene resin.

6. The thermal transfer recording sheet as claimed in claim 1, wherein said support has a thickness of from 50 to 500 μm and said thermal transfer image-receiving layer has a thickness of from 0.2 to 20 μm.

7. The thermal transfer recording sheet as claimed in claim 1, wherein said support is a biaxially stretched microvoid-containing film obtained by stretching a thermoplastic resin film containing from 3 to 60% by weight of a petroleum resin, from 5 to 60% by weight of an inorganic fine powder, and from 20 to 92% by weight of a thermoplastic resin in the machine direction at a stretch ratio of from 3 to 10 and in the transverse direction at a stretch ratio of from 3 to 15.

8. The thermal transfer recording sheet as claimed in claim 1, wherein said support has a thickness of from 55 to 250 μm.

9. The thermal transfer recording sheet as claimed in claim 1, wherein said support is a biaxially stretched microvoid-containing film obtained by stretching a thermoplastic resin film containing from 5 to 50% by weight of a petroleum resin, from 10 to 45% by weight of an inorganic fine powder, and from 25 to 85% by weight of a thermoplastic resin in the machine direction at a stretch ratio of from 4 to 7 and in the transverse direction at a stretch ratio of from 4 to 12.

10. The thermal transfer recording sheet as claimed in claim 1, wherein said support is a microvoid-containing laminate film prepared by laminating (A) a thermoplastic resin film containing from 3 to 60% by weight of a petroleum resin, from 5 to 60% by weight of an inorganic fine powder, and from 20 to 92% by weight of a thermoplastic resin as a surface layer and (B) a thermoplastic resin film containing from 5 to 60% by weight of an inorganic fine powder as a base layer and biaxially stretching the laminate at a stretch ratio of from 3 to 10 in the machine direction and at a stretch ratio of from 3 to 15 in the transverse direction, either simultaneously or successively, said layer (A) containing the petroleum resin being the side on which said thermal transfer-image receiving layer is formed.

11. The thermal transfer recording sheet as claimed in claim 10, wherein said layer (A) has a thickness of from 2 to 40 μm and the support has a total thickness of from 55 to 250 μm.

12. The thermal transfer recording sheet as claimed in claim 10, wherein said layer (B) contains 60% by weight or less of a petroleum resin.

13. The thermal transfer recording sheet as claimed in claim 1, wherein said support is a microvoid-containing laminate film prepared by laminating (A) a thermoplastic resin film containing from 5 to 50% by weight of a petroleum resin, from 10 to 45% by weight of an inorganic fine powder, and from 25 to 85% by weight of a thermoplastic resin as a surface layer and (B) a thermoplastic resin film containing from 10 to 45% by weight of an inorganic fine powder as a base layer and biaxially stretching the laminate at a stretch ratio of from 4 to 7 in the machine direction and at a stretch ratio of from 4 to 12 in the transverse direction, either simultaneously or successively, said layer (A) containing the petroleum resin being the side on which the thermal transfer-image receiving layer is formed.

14. The thermal transfer recording sheet as claimed in claim 13, wherein said layer (A) has a thickness of from 2 to 40 μm, and the support has a total thickness of from 55 to 250 μm.

15. The thermal transfer recording sheet as claimed in claim 13, wherein said layer (B) contains 60% by weight or less of a petroleum resin.

16. The thermal transfer recording sheet as claimed in claim 1, wherein said support is a microvoid-containing laminate film obtained by laminating (A) an unstretched thermoplastic resin film containing from 3 to 60% by weight of a petroleum resin, from 10 to 80% by weight of an inorganic fine powder, and from 20 to 87% by weight of a thermoplastic resin as a surface layer on one side of (B) a uniaxially stretched film obtained by stretching a thermoplastic resin film containing from 5 to 45% by weight of an inorganic fine powder at a stretch ratio of from 3 to 10 as a base layer, laminating (C) a thermoplastic resin film containing from 10 to 80% by weight of an inorganic fine powder on the other side of said base layer (B), and stretching the laminate in the direction perpendicular to the stretching direction of said uniaxially stretched thermoplastic resin film at a stretch ratio of from 3 to 15 using a tenter.

17. The thermal transfer recording sheet as claimed in claim 16, wherein said layer (A) has a thickness of from 2 to 40 μm and the support has a total thickness of from 55 to 250 μm.

18. The thermal transfer recording sheet as claimed in claim 16, wherein said base layer (B) contains 60% by weight or less of a petroleum resin.

19. The thermal transfer recording sheet as claimed in claim 1, wherein said support is a microvoid-containing laminate film obtained by laminating (A) an unstretched thermoplastic resin film containing from 5 to 50% by weight of a petroleum resin, from 15 to 65% by weight of an inorganic fine powder, and from 25 to 80% by weight of a thermoplastic resin as a surface layer on one side of (B) a uniaxially stretched film obtained by stretching a thermoplastic resin film containing from 8 to 30% by weight of an inorganic fine powder at a stretch ratio of from 4 to 7 as a base layer, laminating (C) a thermoplastic resin film containing from 15 to 65% by weight of an inorganic fine powder on the other side of said base layer (B), and stretching the laminate in the direction perpendicular to the stretching direction of said uniaxially stretched thermoplastic resin film at a stretch ratio of from 4 to 12 using a tenter.

20. The thermal transfer recording sheet as claimed in claim 19, wherein said surface layer (A) has a thickness of from 2 to 40 μm and the support has a total thickness of from 55 to 250 μm.

21. The thermal transfer recording sheet as claimed in claim 19, wherein said base layer (B) contains from 5 to 30% by weight of a petroleum resin.

* * * * *